US007949997B2

(12) United States Patent
Chessell et al.

(10) Patent No.: US 7,949,997 B2
(45) Date of Patent: May 24, 2011

(54) INTEGRATION OF SOFTWARE INTO AN EXISTING INFORMATION TECHNOLOGY (IT) INFRASTRUCTURE

(75) Inventors: Amanda E. Chessell, Alton (GB); Giles J. B. Dring, Huddersfield (GB); Richard A. Hopkins, Yarm (GB); Robert J. Lojek, Lythan-St. Annes (GB); Christopher C. Winter, Waterlooville (GB); Larry Yusuf, Eastleigh (GB)

(73) Assignee: International Business Machines Corporation, Armonk, NY (US)

( * ) Notice: Subject to any disclaimer, the term of this patent is extended or adjusted under 35 U.S.C. 154(b) by 1263 days.

(21) Appl. No.: 11/345,138

(22) Filed: Jan. 31, 2006

(65) Prior Publication Data

US 2006/0184933 A1    Aug. 17, 2006

(30) Foreign Application Priority Data

Feb. 11, 2005   (GB) .................................. 0502837.8

(51) Int. Cl.
*G06F 9/44* (2006.01)

(52) U.S. Cl. ........ 717/120; 717/101; 717/104; 717/106; 717/109

(58) Field of Classification Search ........................ None
See application file for complete search history.

(56) References Cited

U.S. PATENT DOCUMENTS

| 6,167,564 | A  | * | 12/2000 | Fontana et al. | ............... | 717/104 |
| 6,253,337 | B1 | * | 6/2001  | Maloney et al. | ............... | 714/38  |
| 6,308,178 | B1 | * | 10/2001 | Chang et al.   | ................| 1/1     |
| 6,671,724 | B1 | * | 12/2003 | Pandya et al.  | ................| 709/226 |
| 7,047,518 | B2 | * | 5/2006  | Little et al.  | ..................| 717/108 |
| 2003/0023953 | A1 | * | 1/2003 | Lucassen et al. | ............ | 717/106 |
| 2003/0105887 | A1 | * | 6/2003 | Cox et al.    | ....................| 709/328 |
| 2003/0120502 | A1 | * | 6/2003 | Robb et al.   | ........................| 705/1 |

(Continued)

FOREIGN PATENT DOCUMENTS

CA    2 436 763 A1    2/2005

OTHER PUBLICATIONS

Frankel, David, "Model Driven Architecture: Applying MDA to Enterprise Computing", Copyright 2003 Wiley Publsihing Pages (preface) XV, 41, 94.*

(Continued)

*Primary Examiner* — Chameli C. Das
*Assistant Examiner* — Samuel Hayim
(74) *Attorney, Agent, or Firm* — Schmeiser, Olsen & Watts; John Pivnichny

(57) ABSTRACT

A method and apparatus for integrating a software application into an information technology (IT) infrastructure. An inventory is created using a Model-Driven Architecture (MDA) approach from the Object Management Group (OMG). The inventory includes information about: each component of the IT infrastructure, the software application, how each component communicates with each other component, and how the software application communicates with each component. Each element of information in the inventory has a single source and owner. The inventory is used to analyze the IT infrastructure and the software application during integrating the software application. From contents of the inventory, using the MDA approach from the OMG, artifacts that execute the integration are generated, and test programs are generated to verify that the integration is complete and correct. The inventory is progressively updated during and after the integration as more information about the IT infrastructure or the software application is developed.

15 Claims, 6 Drawing Sheets

OVERVIEW OF THE SOLUTION FACTORY GENERATION PROCESS

U.S. PATENT DOCUMENTS

| | | | |
|---|---|---|---|
| 2003/0182651 A1* | 9/2003 | Secrist et al. | 717/120 |
| 2003/0182652 A1* | 9/2003 | Custodio | 717/122 |
| 2005/0114829 A1* | 5/2005 | Robin et al. | 717/101 |
| 2005/0166178 A1* | 7/2005 | Masticola et al. | 717/104 |
| 2005/0216882 A1* | 9/2005 | Sundararajan et al. | 717/104 |

OTHER PUBLICATIONS

Gregory Abowd Anind Dey, "Applying Dynamic Integration as a Software Infrastructure for Context-Aware Computing" Future Computing Environments ICSE 1998. <http://www.cc.gatech.edu/fce/cyberdesk/pubs/ICSE98/ICSE98.html> all pages.*

Eric de Sturler et al. "A New Approach to Software Integration Frameworks for Multi-Physics Simulation Codes" University of Illinois Feb. 1, 2001, <http://webcache.googleusercontent.com/search?q=cache:z0OTB-5ph8sJ:charm.cs.illinois.edu/papers/FrameworkIFIP00.ps+software+integration+in+existing+framework&cd=1&hl=en&ct=clnk&gl=us> All pages.*

* cited by examiner

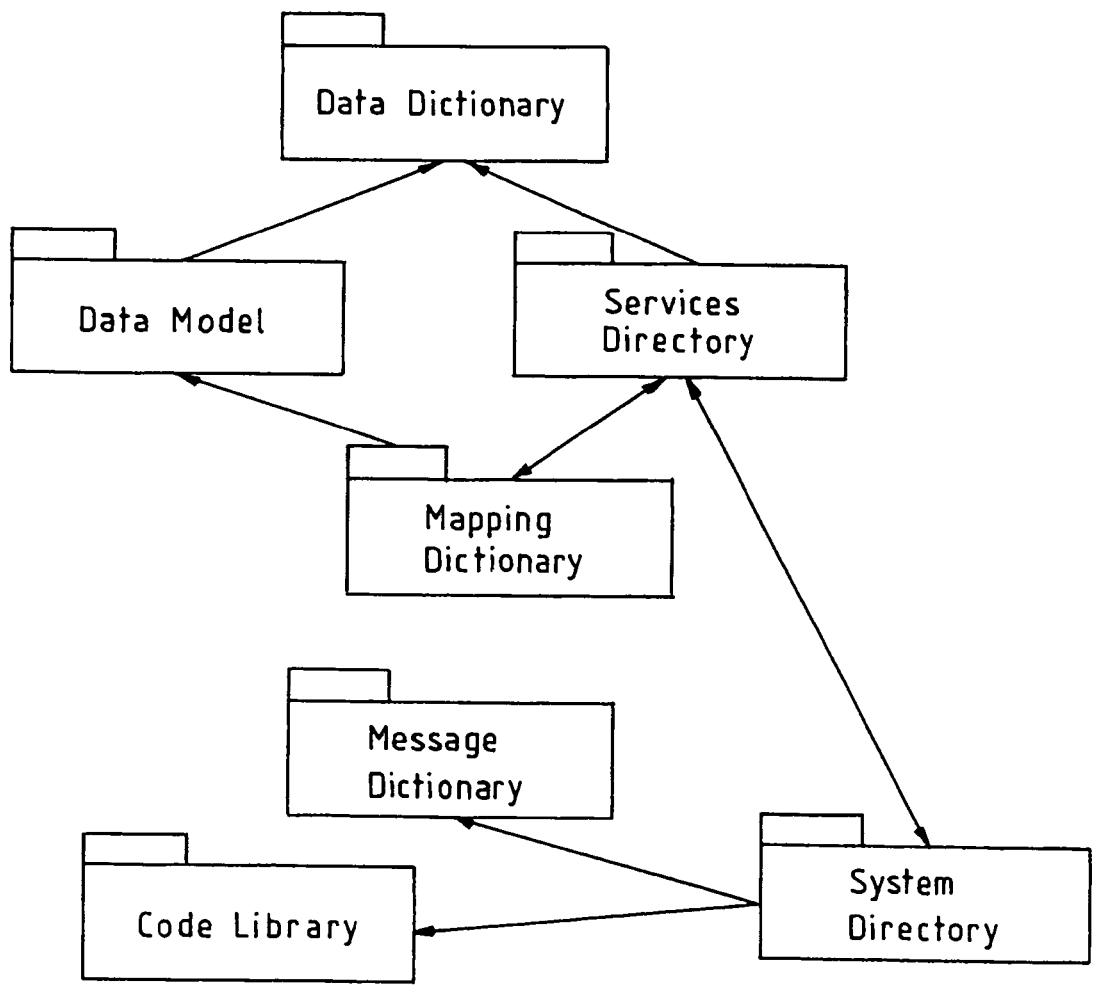
FIG. 1  EXAMPLE DOMAIN STRUCTURE

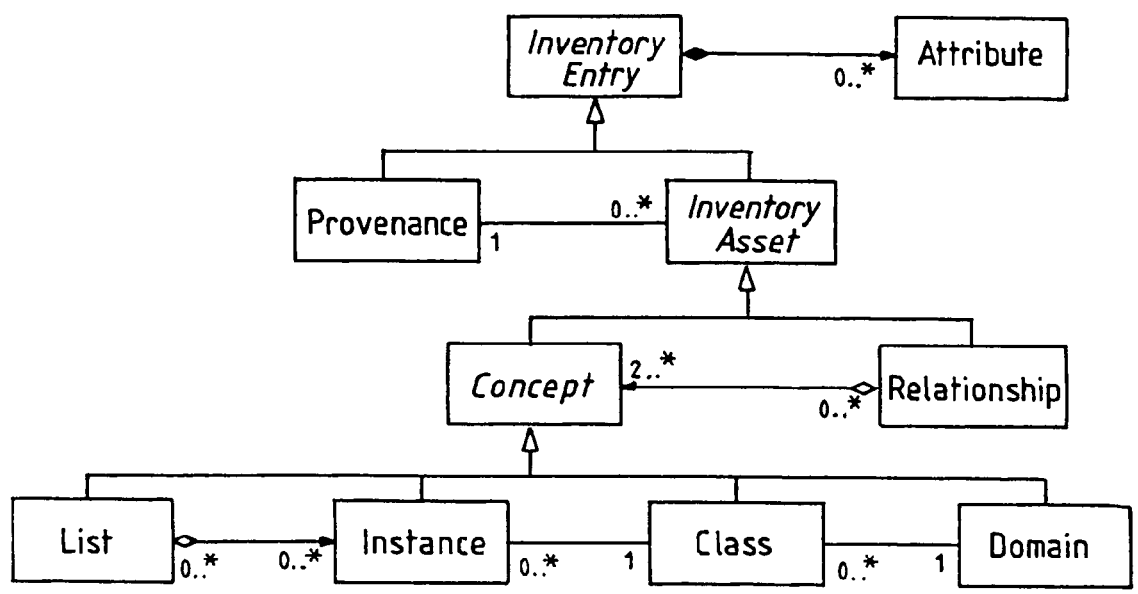
FIG. 2    EXAMPLE STRUCTURE OF THE INVENTORY

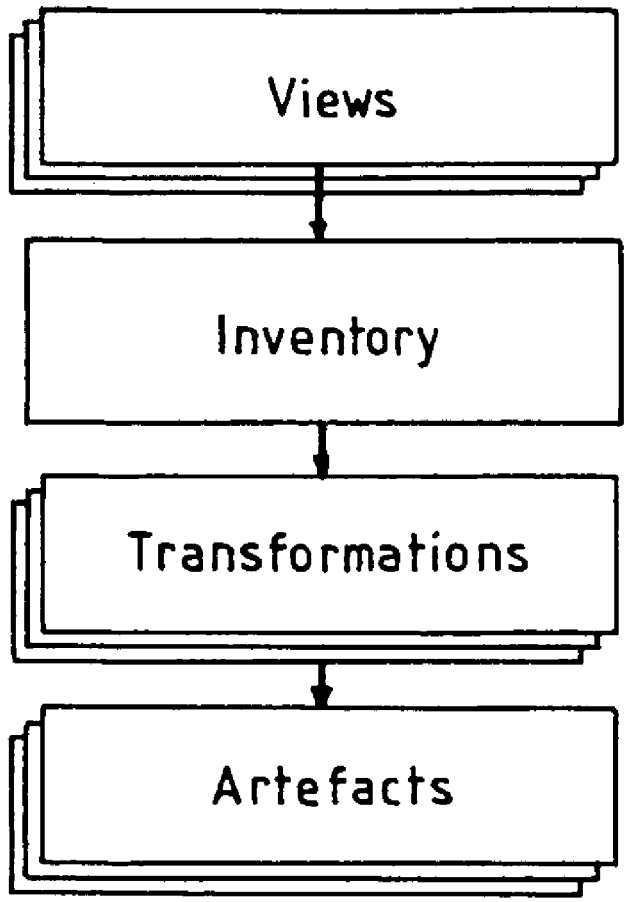
FIG. 3   ARCHITECTURAL PATTERN FOR THE GENERATED SOLUTION FACTORY

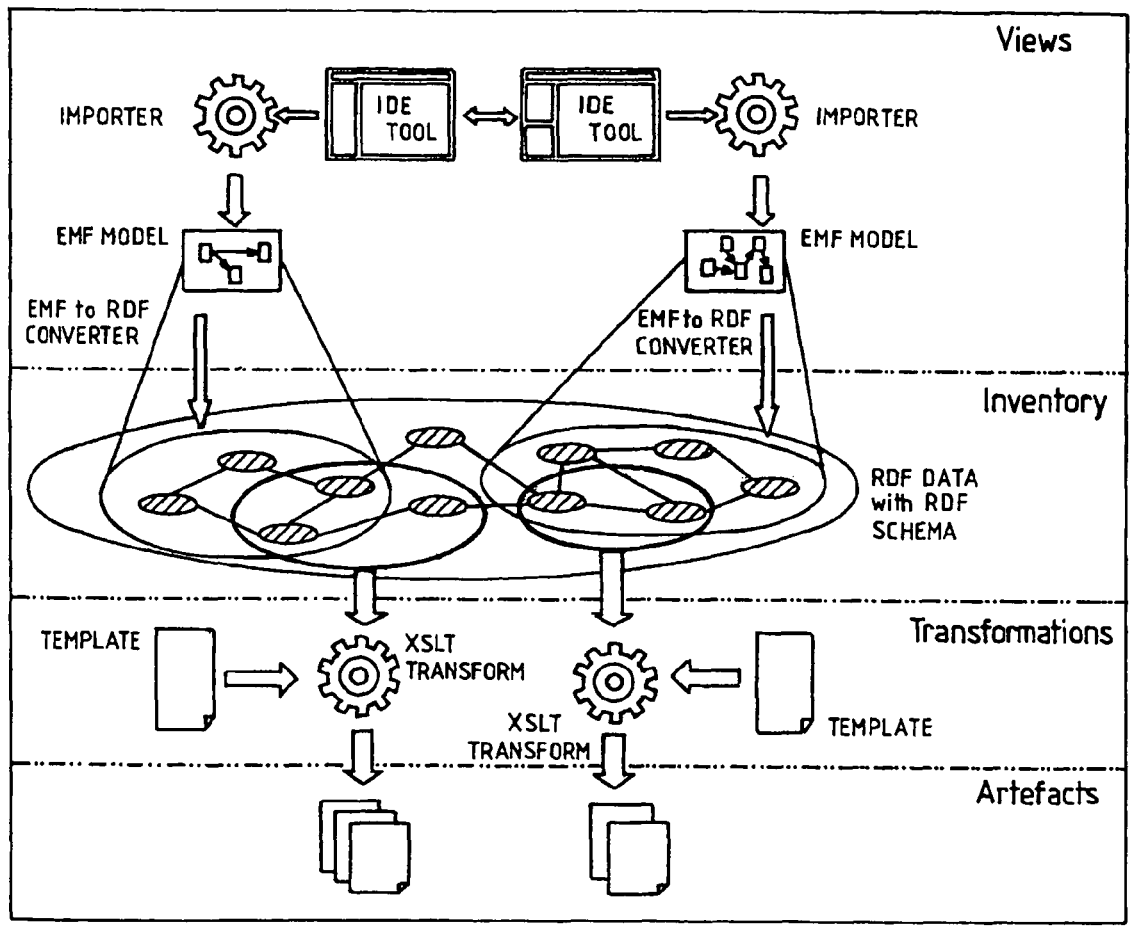
FIG. 4    EXAMPLE OF A SOLUTION FACTORY

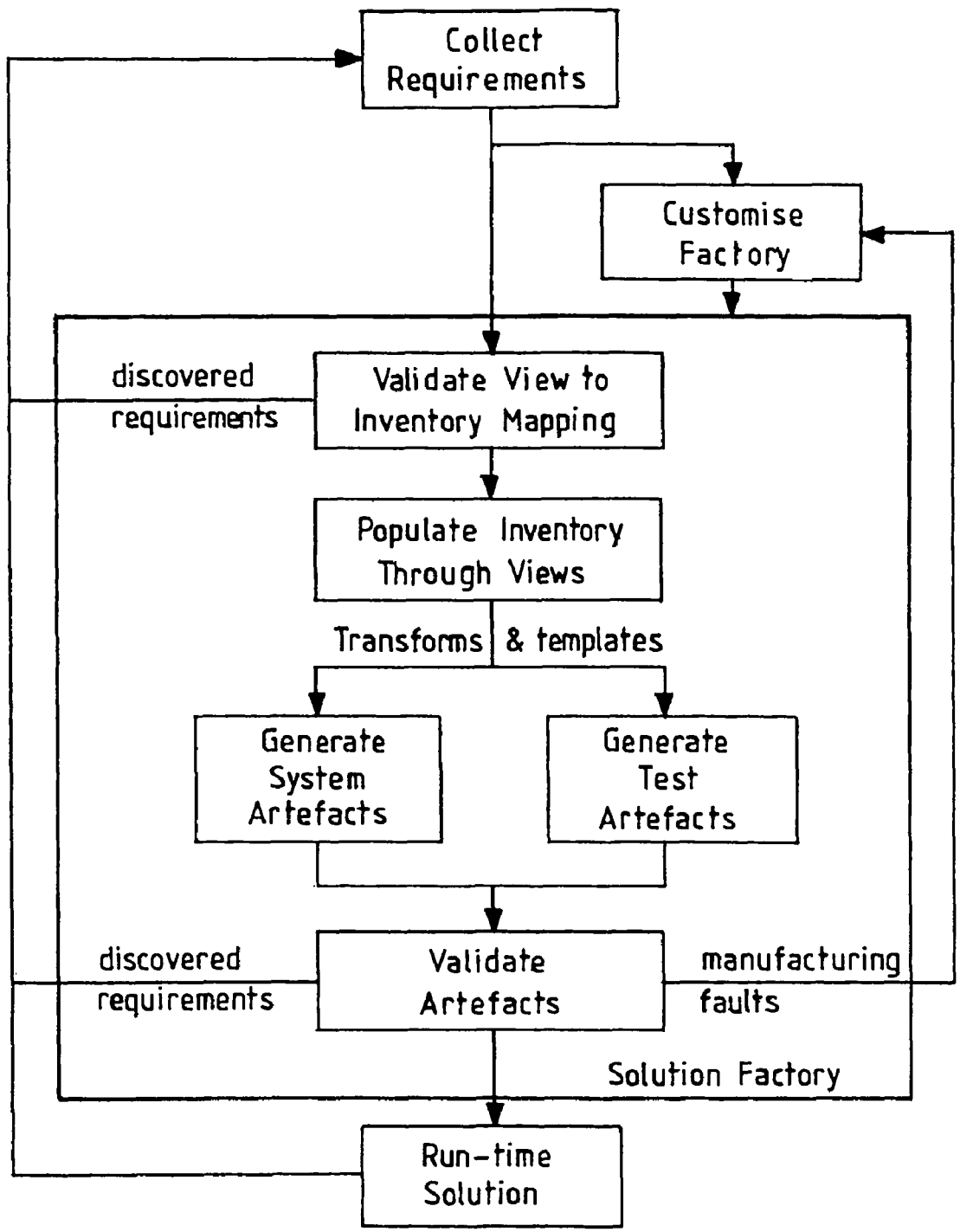
FIG. 5  OVERVIEW OF THE SOLUTION FACTORY GENERATION PROCESS

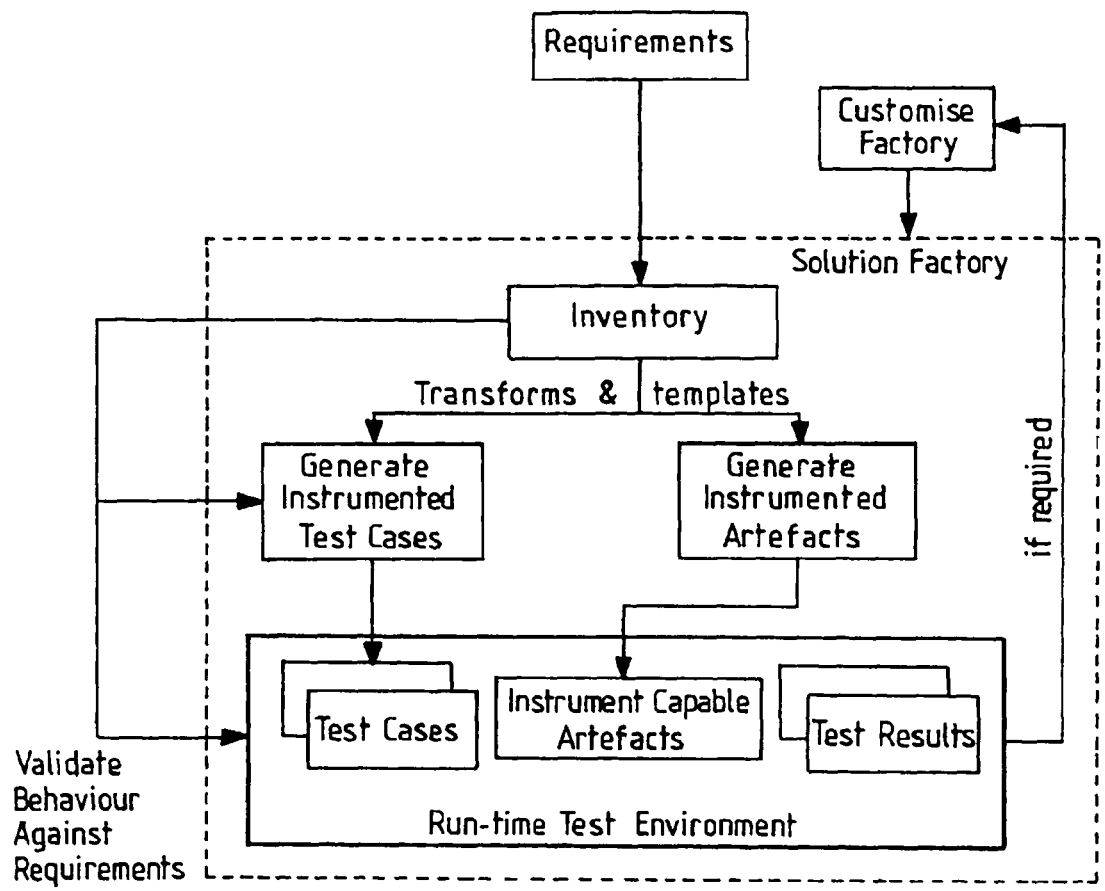
FIG. 6  FLOWCHART OF THE VALIDATIONS OF THE TRANSFORMATIONS THAT ARE PERFORMED BY THE SOLUTION FACTORY

INTEGRATION OF SOFTWARE INTO AN EXISTING INFORMATION TECHNOLOGY (IT) INFRASTRUCTURE

PRIORITY

The present invention claims priority from United Kingdom Patent Application No. 0502837.8, filed on Feb. 11, 2005, in the United Kingdom Patent Office.

BACKGROUND OF THE INVENTION

1. Technical Field

The present invention relates to the field of data processing, and particularly to the field of integrating a commercial off the shelf (COTS) software application into an existing information technology (IT) infrastructure.

2. Related Art

Many users of IT infrastructures can no longer afford to write a new business application each time their business changes. They prefer to buy a Commercial Off-The-Shelf (COTS) package and then integrate it with their existing systems.

According to the current state of the art, integration projects will typically make use of integration software and tooling. The integration team analyses each system in turn to determine the structure and content of the messages that need to be passed in and out of it in order to make the system perform certain operations. They then use the integration tooling and runtime to create components that route and transform messages, events and requests that flow between the systems at appropriate times to form the combined "solution".

Increasingly, the cost of integrating systems is becoming greater than the cost of the software packages themselves. There are a number of reasons for this.

The systems being integrated (new and old) belong to different areas of ownership within the organization. This means inter-organizational teams need to cooperate since both the background information for the project and the ownership of design artifacts is distributed.

Pre-existing/COTS-based systems are typically not that well understood and often the only way to discover how they really work is to run them. This means new knowledge and requirements relating to the integration code around these systems can be discovered very late in the development cycle. This can lead to significant levels of rework. Most integration tooling operates at a very detailed, low-level of analysis.

There is no single set of tooling that spans the entire integration solution and so there is always an issue of keeping multiple copies of the data in different tools synched up.

All-in-all this is time-consuming, error prone and there is no "big-picture" view enabling high-level reasoning about the end-to-end solution. The high cost and unpredictable nature of integration projects is a concern to the Services business.

One area in which such integration has been explored in the prior art involves the well known standard architecture known as the Model Driven Architecture. The Model-Driven Architecture (MDA) concepts from the Object Management Group (OMG) describe the idea that you can create a model of a system and generate code from the model. The commercial exploitation of MDA in the early prior art focuses on generating the code for a component from a model of its behaviour. This approach is often referred to as a Software factory. A good example description is available here: http://msdn.microsoft.com/architecture/overview/softwarefactories/

Some later prior art in this area involved using MDA modeling techniques to integrate a new COTS application into an existing IT infrastructure. See, for example, the Kabira Adapter Factory, and see also the Object Management Group's web pages describing the use of MDA to perform this integration. However, such prior art assumed that all of the requirements of the COTS application and IT infrastructure were known and fixed at the time when the integration process begins.

The prior art is therefore inflexible and does not take account of changing needs over time.

In addition to COTS applications, which usually need no customization, this problem also exists when integrating an existing software application that needs to be customized, into an existing IT infrastructure.

SUMMARY OF THE INVENTION

The present invention provides a method for performing integration of a software application into an existing information technology (IT) infrastructure, said method comprising the steps of:

(a) creating an inventory, using a Model-Driven Architecture (MDA) approach from the Object Management Group (OMG), the inventory including information about each component of the IT infrastructure and information about the software application being integrated into the IT infrastructure, and information about how each component communicates with each other component of the IT infrastructure, and information about how the software application communicates with each component, wherein each element of information in the inventory has a single source and owner;

(b) using the inventory to analyze the existing IT infrastructure and the software application during the integration of the software application into the existing IT infrastructure;

(c) from the contents of the inventory, using the MDA approach from the OMG, generating artifacts that execute the integration; and (d) from the contents of the inventory, using the MDA approach from the OMG, generating test programs to verify that the integration is complete and correct;

wherein the inventory is progressively updated during and after the integration process as more information about the IT infrastructure or the software application is developed.

The present invention provides an apparatus for performing integration of a software application into an existing information technology (IT) infrastructure, said apparatus comprising:

(a) means for creating an inventory, using a Model-Driven Architecture (MDA) approach from the Object Management Group (OMG), the inventory including information about each component of the IT infrastructure and information about the software application being integrated into the IT infrastructure, and information about how each component communicates with each other component of the IT infrastructure, and information about how the software application communicates with each component; wherein each element of information in the inventory has a single source and owner; and (b) means for using the inventory to analyze the existing IT infrastructure and the software application during the integration of the software application into the existing IT infrastructure;

(c) means for, from the contents of the inventory, using the MDA approach from the OMG, generating artifacts that execute the integration; and (d) means for, from the contents of the inventory, using the MDA approach from the OMG, generating test programs to verify that the integration is complete and correct;

wherein the inventory is progressively updated during and after the integration process as more information about the IT infrastructure or the software application is developed.

BRIEF DESCRIPTION OF THE DRAWINGS

FIG. 1 shows an example domain structure of the inventory, according to embodiments of the present invention.

FIG. 2 shows an example structure of the inventory, showing how concepts are represented and connected together, according to embodiments of the present invention.

FIG. 3 shows the architectural pattern for the generated solution factory, according to embodiments of the present invention.

FIG. 4 shows an example of a solution factory, according to embodiments of the present invention.

FIG. 5 shows an overview of the solution factory generation process, according to embodiments of the present invention.

FIG. 6 shows a flowchart of the validations of the transformations that are performed by the solution factory, according to embodiments of the present invention.

DETAILED DESCRIPTION OF THE INVENTION

The present invention involves iteratively generating/adapting a Model Driven Software Factory that is customized to the needs of a particular client engagement. The process of generating the software factory is iterative so that the software factory can be modified during the client engagement as new knowledge and requirements are unearthed.

In addition, the factory is referred to as a solution factory since it covers all aspects of the generation of the solution and not just the runtime artifacts. The solution factory has a philosophy that all information has a single source. There is no need to support round-tripping through a tool chain.

At the core of the solution factory is a single Inventory where the contents follow a write-once-read-many philosophy as follows. The inventory is populated from a variety of tools using a controlled publish process that ensures each item in the Inventory has an identifiable single source and owner. This eliminates the need to support round-tripping through a tool chain since all updates occur in the tool that generated the original model. These updates are then republished to the inventory in controlled versions. It also established clear ownership rules for the creation and maintenance of the data. This is a key requirement in integration environments where the information needed to complete the integration is discovered throughout the lifetime of the project. Often new knowledge contradicts what was known before so the ability to maintain a consistent view across the organization is a key success factor. In addition, the information needed to build an integration artifact typically needs to come from each of the systems being integrated. Having clear ownership rules define what information each system owner is responsible for providing.

The inventory contains information from many different knowledge domains of the system (business, technical, operations) that are linked together offering a full definition of how the business connects to the IT systems. It becomes a replacement of the systems documentation which retains its accuracy since the system artifacts are generated from it.

The structure and format of the Inventory is consistent to allow standard tools, such as inference engines, to explore and derive new information about the system.

More significantly, having information from multiple domains in a single, linked and coherent format means transformations can generate system artifacts with traceability information embedded in them that links each one to its relevant business concepts. At runtime, the traceability information can be included in events, messages and diagnostics.

The Inventory becomes a key resource for the business and survives beyond the life of the development project and is used in the operation of the integrated IT system.

The correctness of the solution factory is self-checking due to instrumentation code that is added to the generated artifacts and test environment ensuring the generated code matches the requirements.

The whole method and factory is available for the maintenance of the solution.

The solution can thus be used to integrate a software application (which could be a COTS application or which could be an application which requires more customization than a COTS application) into an existing IT infrastructure.

Domains, Team Structure and Inventory Content

The Inventory is used to store all of the information needed by the solution factory to generate the required Solution.

An integration project needs information from a variety of sources. For example, each organization that owns a system needs to provide information about that system. There are also different domains of information required, ranging from the business level information right down to the format of messages that flow around the network. The diagram in FIG. 1 shows the sort of domains that could be found in an Inventory.

Within each domain there are many instances of different types of concepts with relationships between them.

For example, the Data Dictionary domain could store business type information such as the fact that a customer object is used in the IT infrastructure and the customer object should specify the name and address of a particular customer. No particular customer information is specified in this domain, since this domain is just a dictionary of the kinds of terms that are used in a business.

The Data Model domain would specify specific examples, such as, Larry's car insurance. The Services Directory domain would specify which particular services are exposed, such as a credit check service, where a potential customer of a car insurance business could have his credit checked.

Moving further down the domain structure, we move away from the business-oriented subject matter and move more towards the physical implementation requirements of the various components of the IT infrastructure. For example, the Message Dictionary domain tells you that a particular message which is to be passed from one specific component to another is an MQ (message queuing) message. Further, the System Directory domain specifies where a particular component is physically implemented (i.e., which server a particular piece of software is running on).

The Inventory has a standard structure that allows concepts to be represented and connected together. For example, it would contain the information shown in the diagram of FIG. 2.

Where Inventory Entry represents an abstract entry in the Inventory. Each Inventory Entry may have a number of Attributes associated with it.

There are two types of Inventory Entry: Provenance and Inventory Asset. Provenance provides information about the source of the Inventory Asset—for example, which view it came from, the owner, the date added, the version number. Inventory Asset describes a piece of data that is relevant to the project. There are two types of Inventory Assets: Concept and Relationship.

Concept represents an object from the integration environment. It may be a standard object, or something specific to this project. There are four main types of concept shown. More could be added during factory customization.

List is a list of related Instances.

Instance is a description of a
n object we wish to describe in the inventory.

Class describes the class/category of an Instance—for example, Service, Operation, Message, . . . .

Domain describes a knowledge domain of the Class.

Relationship describes a relationship between two or more Entities

Architectural Pattern for the Generated Solution Factory (VITA)

The Inventory is part of the VITA architectural pattern. There are four parts to it, as shown in FIG. 3.

The Views provide the means to create, view, and update controlled subsets of the contents of the inventory. A view is typically maintained using a standard tool. It represents a particular user (or group of users) view of the system. Different groups can (and typically do!) use different tools to create their own particular view(s). So one team could define their message structures using XML Schema and another team could use UML for the same task. The Transformations (which may need to pull information that originated in more than one view) are protected from this variation by the Inventory.

The Inventory stores the data from each model. It supports versioning, access control and assumes that ownership of the contents is distributed. The inventory is populated by Importers. An Importer is part of a View. It takes selected data from the View tooling, converts it to the Inventory format and publishes it to the Inventory. This process is controlled by the owner of the View.

A Transformation reads a selected subset of the data from the Inventory and combines it with a template to generate an Artifact.

An Artifact is a "document" that is directly useful to the project. It could be a report or runtime code/XML or test program.

FIG. 4 shows an example of a solution factory:

Models of each aspect of the system are authored using the data-owner's favorite tool. The model file created is considered the master and will always be updated using this tool. There is no need to support round-tripping through a tool chain. When a correct version of the model is complete, an importer is run to re-format the contents of the model into the inventory.

An embodiment of the Inventory is based on the W3C Resource Definition Framework (RDF) and RDF Schema. This technology makes it easy to incrementally add to the content of the inventory The transforms perform these sorts of tasks Auto generate the integration code required to connect systems of different types together from a model describing the mapping between the data structures used in each system.

Auto generate the regression test environment (code/data) to test that the integration code matches the requirements Auto generate metadata files and documentation as well as code.

Overview of the Solution Factory Generation Process

FIG. 5 shows the flowchart of the process of generating the solution factory.

Collect Requirements

The integration team collects requirements for the project. This identifies the organizations, systems and interactions needed between the systems. Each iteration through this node enhances the team's understanding of the Solution.

Customize Factory

Whenever a new type of artifact is identified or a test fails because of a manufacturing fault, the factory is Customized. Examples of customizations includes:

Enhancing the meta-model defining the information needed to generate each artifact type. This meta-model is the schema of the Inventory Coding of transformations to generate any unsupported system and test artifacts from information from the inventory.

Definition of a governance model that specifies what information needs to be provided by each organization unit. Each unit then decides what tools they want to use to model this information and how they are going to publish versions of their models to the inventory. They may need to write importers from the format used by their tools to the format of the repository.

Validate View to Inventory Mapping

The content of each view is examined and the rules/transforms for mapping from its key types to the inventory are defined in an Importer. This is a key step in validating the solution factory because it identifies missing information and clarifies ownership boundaries and responsibilities.

Populate Inventory through Views

The Importers are run by the View owner.

Generate System Artifacts and Generate Test Artifacts

The solution factory transformations are run to generate both the system (runtime and documentation) and test artifacts. These artifacts contain sufficient instrumentation to validate their behavior against the requirements. The system artifacts, which may comprise runtime code, are configured to execute integration of the software application into the existing IT infrastructure.

Validate Artifacts

The system artifacts are exercised using the test artifacts. The instrumentation is used to verify that the system artifacts meet the requirements. Two types of errors can be detected: manufacturing errors (caused by an error in the solution factory) and missing requirements Run-Time Solution The solution is ready to deploy—it can be enhanced by iterating back to Collect Requirements. For example, the inventory may be progressively updated during and after the integration process as more information about the IT infrastructure or the software application is developed.

Ensuring Self-Validating Feedback Loop

The validation of the transformations that are performed by the solution factory are shown in FIG. 6. This is done by using XML based instrumentation. The artifact code transformations have two modes of operation, instrumentation and deployment. In instrumentation mode, the transformations produce code that supports the transport of instrumented XML annotations. These annotations effectively describe the transformation "trace-route" listing all dependencies and intermediate operations for each resultant value.

Since the artifacts have been generated from the inventory, instrumentation makes it is possible to use the inventory to validate the artifact generation process itself, i.e. the solution factory. Since each annotated resultant value contains its full processing route as described in the inventory, the inventory and the annotation must describe the same path. If there is a difference, there is an error in the solution factory.

Instrumented test cases are generated to provide in such a way that maximum scenario coverage is achieved. One the instrumented results for all cases match the description in the inventory, the solution factory is fully validated.

A computer program product stored on a computer readable storage medium may comprise computer code that, when run on a computer system, instructs the computer system to carry out the methods of the present invention. The computer readable storage medium is a medium for the storage of data and not for the transmission of data.

What is claimed is:

1. A method for performing integration of a software application into an existing information technology (IT) infrastructure, said method comprising:
   creating a plurality of views, each view being created by a different group of an integration project of a business, each different group using a different tool to effectuate creation of each view, each view configured to create a different subset of contents of an inventory that includes domains of information needed by the integration project;
   validating each view, said validating each view comprising defining rules and transforms for mapping key types of content of each view to the inventory, identifying missing information from the content of each view, and clarifying ownership boundaries and responsibilities for each view;
   creating the inventory through use of the views, said creating the inventory comprising populating the domains of information in the inventory, said domains of information comprising a data dictionary domain which defines terms used in the business, a services domain specifying services which are exposed, a message dictionary domain comprising information on a format of a message, and a system directory domain specifying where each software component of the IT infrastructure is physically located;
   generating system artifacts, said system artifacts being generated from the contents of the inventory in combination with first templates, said system artifacts comprising runtime code configured to execute integration of the software application into the existing IT infrastructure;
   generating test artifacts, said test artifacts being generated from the contents of the inventory in combination with second templates, said test artifacts comprising test programs for validating the system artifacts;
   validating the system artifacts through use of the test artifacts, said validating the system artifacts comprising verifying that the system artifacts meet requirements for the system artifacts;
   deploying the runtime code of the system artifacts to execute integration of the software application into the existing IT infrastructure; and
   progressively updating the inventory as more information about the IT infrastructure or the software application is developed.

2. The method of claim 1, wherein said populating the domains of information in the inventory is implemented using a plurality of tools using a controlled publish process, to ensure that each element of information in the domains of information in the inventory has an identifiable single source and owner.

3. The method of claim 1, wherein the software application is a custom off the shelf (COTS) software application.

4. The method of claim 1, wherein the method further comprises representing a structure of the inventory, wherein the structure of the inventory comprises:
   plurality of inventory assets, wherein each inventory asset describes data that is relevant to the project, and wherein each inventory asset comprises a concept that includes an instance of a description of an object in the inventory, a class describing a category of the instance, and a domain describing a knowledge base of the class; and
   for each inventory asset, a provenance providing information about each inventory asset, wherein the information about each inventory asset consists of a view that each inventory asset came from, a date that each inventory asset was added to the inventory, and a version number of each inventory asset.

5. The method of claim 1, wherein the method further comprises:
   ascertaining a test failure due to a manufacturing fault; and
   in response to said ascertaining the test failure, coding transformations to generate an unsupported system of the IT infrastructure.

6. An apparatus for performing integration of a software application into an existing information technology (TT) infrastructure, said apparatus comprising:
   means for creating a plurality of views, each view being created by a different group of an integration project of a business, each different group using a different tool to effectuate creation of each view, each view configured to create a different subset of contents of an inventory that includes domains of information needed by the integration project;
   means for validating each view, said validating each view comprising defining rules and transforms for mapping key types of content of each view to the inventory, identifying missing information from the content of each view, and clarifying ownership boundaries and responsibilities for each view;
   means for creating the inventory through use of the views, said creating the inventory comprising populating the domains of information in the inventory, said domains of information comprising a data dictionary domain which defines terms used in the business, a services domain specifying services which are exposed, a message dictionary domain comprising information on a format of a message, and a system directory domain specifying where each software component of the IT infrastructure is physically located;
   means for generating system artifacts, said system artifacts being generated from the contents of the inventory in combination with first templates, said system artifacts comprising runtime code configured to execute integration of the software application into the existing IT infrastructure;
   means for generating test artifacts, said test artifacts being generated from the contents of the inventory in combination with second templates, said test artifacts comprising test programs for validating the system artifacts;
   means for validating the system artifacts through use of the test artifacts, said validating the system artifacts comprising verifying that the system artifacts meet requirements for the system artifacts;

means for deploying the runtime code of the system artifacts to execute integration of the software application into the existing IT infrastructure; and means for progressively updating the inventory as more information about the IT infrastructure or the software application is developed.

7. The apparatus of claim 6, wherein the inventory is populated using a plurality of tools using a controlled publish process, therefore ensuring that each element of information in the domains of information in the inventory has an identifiable single source and owner.

8. The apparatus of claim 6, wherein the software application is a custom off the shelf (COTS) software application.

9. The apparatus of claim 6, wherein the apparatus further comprises means for representing a structure of the inventory, wherein the structure of the inventory comprises:

a plurality of inventory assets, wherein each inventory asset describes data that is relevant to the project, and wherein each inventory asset comprises a concept that includes an instance of a description of an object in the inventory, a class describing a category of the instance, and a domain describing a knowledge base of the class; and for each inventory asset, a provenance providing information about each inventory asset, wherein the information about each inventory asset consists of a first view that each inventory asset came from, a date that each inventory asset was added to the inventory, and a version number of each inventory asset.

10. The apparatus of claim 6, wherein the apparatus further comprises:

means for ascertaining a test failure due to a manufacturing fault; and means for coding transformations, in response to ascertaining the test failure, to generate an unsupported system of the IT infrastructure.

11. A computer program product, comprising a computer readable tangible storage device, said storage device comprising computer code that, when run on a computer system, implements a method for performing integration of a software application into an existing information technology (TT) infrastructure, said method comprising:

creating a plurality of views, each view being created by a different group of an integration project of a business, each different group using a different tool to effectuate creation of each view, each view configured to create a different subset of contents of an inventory that includes domains of information needed by the integration project;

validating each view, said validating each view comprising defining rules and transforms for mapping key types of content of each view to the inventory, identifying missing information from the content of each view, and clarifying ownership boundaries and responsibilities for each view;

creating the inventory through use of the views, said creating the inventory comprising populating the domains of information in the inventory, said domains of information comprising a data dictionary domain which defines terms used in the business, a services domain specifying services which are exposed, a message dictionary domain comprising information on a format of a message, and a system directory domain specifying where each software component of the IT infrastructure is physically located;

generating system artifacts, said system artifacts being generated from the contents of the inventory in combination with first templates, said system artifacts comprising runtime code configured to execute integration of the software application into the existing IT infrastructure;

generating test artifacts, said test artifacts being generated from the contents of the inventory in combination with second templates, said test artifacts comprising test programs for validating the system artifacts;

validating the system artifacts through use of the test artifacts, said validating the system artifacts comprising verifying that the system artifacts meet requirements for the system artifacts;

deploying the runtime code of the system artifacts to execute integration of the software application into the existing IT infrastructure; and progressively updating the inventory as more information about the IT infrastructure or the software application is developed.

12. The computer program product of claim 11, wherein said populating the domains of information in the inventory is implemented using a plurality of tools using a controlled publish process, to ensure that each element of information in the domains of information in the inventory has an identifiable single source and owner.

13. The computer program product of claim 11, wherein the software application is a custom off the shelf (COTS) software application.

14. The computer program product of claim 11, wherein the method further comprises representing a structure of the inventory, wherein the structure of the inventory comprises:

a plurality of inventory assets, wherein each inventory asset describes data that is relevant to the project, and wherein each inventory asset comprises a concept that includes an instance of a description of an object in the inventory, a class describing a category of the instance, and a domain describing a knowledge base of the class; and for each inventory asset, a provenance providing information about each inventory asset, wherein the information about each inventory asset consists of a view that each inventory asset came from, a date that each inventory asset was added to the inventory, and a version number of each inventory asset.

15. The computer program product of claim 11, wherein the method further comprises:

ascertaining a test failure due to a manufacturing fault; and in response to said ascertaining the test failure, coding transformations to generate an unsupported system of the IT infrastructure.

\* \* \* \* \*